Patented Oct. 31, 1922.

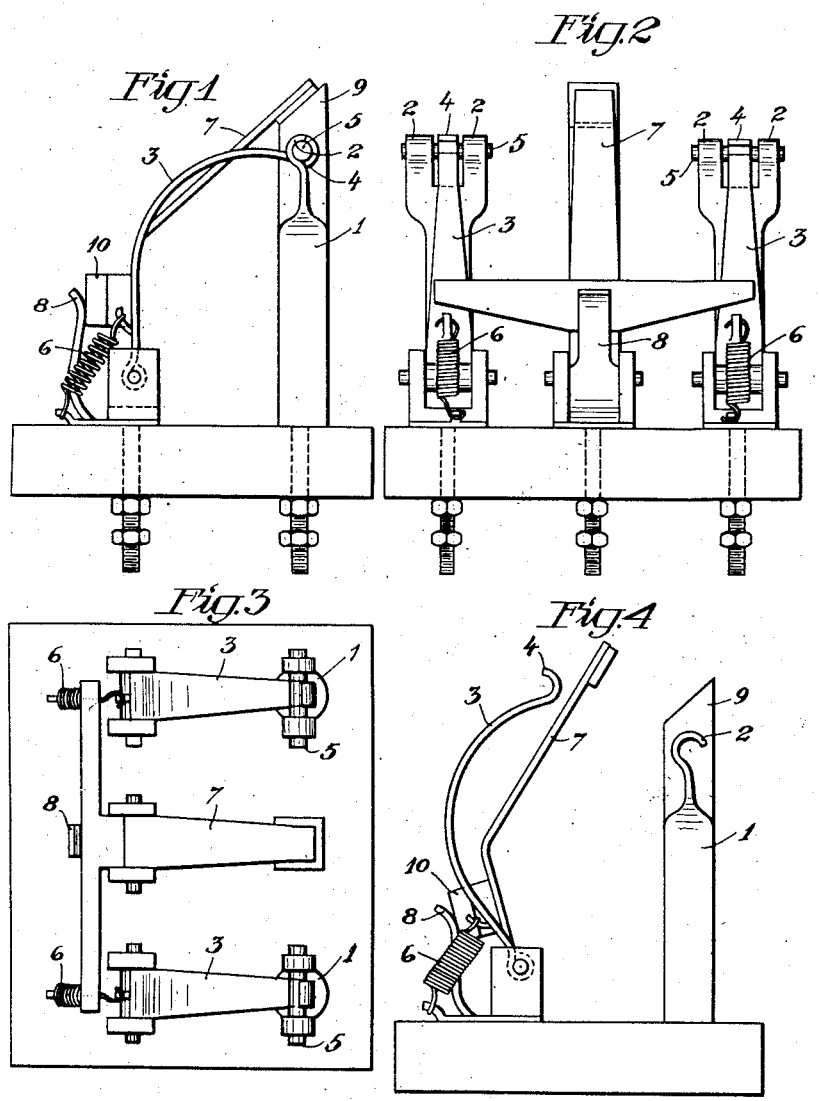

1,434,344

UNITED STATES PATENT OFFICE.

EDWIN JOHNSON, OF PARTILLE, SWEDEN, ASSIGNOR TO ELEKTRISKA AKTIEBOLAGET ECK., OF PARTILLE, SWEDEN.

AUTOMATIC CIRCUIT-BREAKING DEVICE.

Application filed July 19, 1922. Serial No. 576,095.

*To all whom it may concern:*

Be it known that I, EDWIN JOHNSON, engineer, a subject of the King of Sweden, residing at P. O. box 3, Partille, Sweden, have invented certain new and useful Improvements in Automatic Circuit-Breaking Devices, of which the following is a specification.

My invention relates to that kind of electrical apparatus which is known as automatic circuit breaking devices which purpose is automatically to break the circuit at a predetermined value, so as to protect motors or other apparatus which may be connected in the same circuit from being damaged, when overloads or short-circuits take place.

Apparatus manufactured for this purpose is generally of two kinds, namely automatic circuit breakers which open the circuit by separating mechanical contacts, or fuses, which open the circuit by the melting of a fuse metal.

The primary object of my invention is to produce an inexpensive and practical apparatus for the protection of polyphase motors, especially small pump motors. The characteristic of this motor is namely, that it requires in starting a current capacity that is several times larger than the normal running current, and the fuses or circuit breakers that are protecting this circuit must therefore be chosen or calibrated to stand this excess current, and this apparatus will therefore not open on an overload of 50–100%.

One of the most common causes for the destruction of pump motors is that if one of the leads becomes broken, the motor will run on the two remaining connections as a single-phase motor at a current increase of about 50%. As most motors are not designed to stand this excess current they will sooner or later burn out. It may also happen that the motor is thrown in on the circuit with one lead broken, in which case the motor will fail to start. The current will then rise to several times the normal one, and the motor will be destroyed. The apparatus of my invention will in this case act as a protection, as it will operate at an inverse rate of time, because the higher the current, the shorter the time required for its operation. Several devices have been designed to take care of these conditions so that the circuit will automatically open, when a prolonged overload occurs. One of these kinds of apparatus contains a metal strip which will be overheated at a certain prolonged overload, and will cause a circuit breaker to open, another with a time fuse in each phase which will also on a prolonged overload open the circuit. The first mentioned device cannot be closed again until the metal strip has been cooled off, and this fact results generally in a loss of valuable time. In the other case the fuse may operate at only one phase, and fail in the other, as sometimes happens, and this will generally cause the destruction of the motor. There are also apparatus which contain a three-phase fuse-device, combined with a triple pole switch, so arranged that when one or more fuses blow, the switch will open and break the circuit in all three phases.

The apparatus invented by me differs from the above-mentioned in that it contains a fuse contact arrangement in two leads, and a mechanical contact in the third lead, so arranged that the third lead will always open, when one or both of the fuses blow. If one fuse blows, two leads will be opened, and this is enough to cut off the current in which case the motor will stop, and be thus protected. If both fuses blow, all three leads will be opened.

An apparatus of this kind must naturally be an improvement on the one which contains both triple pole fuse and triple pole switch. Another improvement is made in the construction of the fuse-rod and its contacts which will allow an easy and quick renewal of the fuse-rod, when needed.

In the accompanying drawing which illustrates by way of example an embodiment of this invention Fig. 1 shows a side-view of the apparatus, Fig. 2 an end-view, Fig. 3 a plan-view, and Fig. 4 shows the device open.

In this construction the two outside poles are arranged as fuse-contacts, while the middle one is made as a finger contact. The fuse-contacts consist of a stationary contact-rod 1, which may be heated electrically by a winding not shown on the drawing which upper part is developed into double hook or claws 2, and contains also a hinged contact-arm 3, the upper end of which also is developed into a hook 4.

Both hooks 2 and 4 embrace from opposite sides a fuse-plug 5, which is made in form of a rod, and through spring 6, which acts upon arm 3 a good contact between the hooks is secured. The finger-contact consists of a metal-bar which through a spring 8 is kept in good contact with contact stud 9. On the contact finger 7 is fastened a cross bar 10 of insulating material which extends on both sides so that its outer ends come opposite the arms 3.

When one of the fuse-rods 5 melts the contact arm 3 will through the spring 6 be pulled outwards, and at the same time contact 7 will be opened by the cross bar 10. In this way the circuit will always be broken in two phases, when one fuse melts.

The device can also, of course, be made so that the contact finger 7 will normally be held closed by a hook arrangement which will be tripped by contact arm 3.

What I claim as new and desire to secure by Letters Patent of the United States is:—

1. In an automatic circuit breaking device for electrical polyphase motors, a mechanical contact, a plurality of fuse contacts, actuating means operating to displace either or both of the fuse contacts upon melting thereof, and means to transmit movement of the fuse contacts to the mechanical contact whereby the latter is positively actuated by the actuating means through the fuse contacts.

2. In an automatic circuit-breaking device for electrical polyphase motors, a mechanical contact, a fuse contact arranged on each side of the mechanical contact, said fuse contacts including levers and fuse rods normally maintaining the levers in operative position, and means responsive to the melting of either or both of the fuse rods to effect opening of the mechanical contact.

3. In an automatic circuit-breaking device, a mechanical contact, means normally maintaining the mechanical contact in closed position, fuse contacts including movable members and fuse rods normally maintaining the movable members in operative position, and means operative upon melting of either or both of the fuse rods to actuate the movable members of the fuse contacts and move the latter to open position.

4. In an automatic circuit-breaking device, a mechanical contact, a plurality of fuse contacts, each fuse contact including a pair of oppositely arranged hook-shaped members and a fuse rod engaging the hook-shaped members and preventing separation of the latter, and means operating upon melting of either or both of the fuse rods to open the mechanical contacts.

5. In an automatic circuit-breaking device, a mechanical contact, a plurality of fuse contacts, each of the mechanical and fuse contacts including a movable member, means normally retaining the movable member of the mechanical contact in closed position, fuse rods normally retaining the movable members of the fuse contacts in closed position, and means operable upon the melting of either or both fuse rods to actuate the movable member associated therewith and also move the movable member of the mechanical contact to open position.

6. In an automatic circuit breaking device, for automatic polyphase motors, a mechanical contact including a pivoted member, a plurality of fuse contacts each including a pivoted member, actuating means operating to swing either or both of the fuse contacts upon melting thereof, and means to transmit the swinging movement of the fuse contacts to the mechanical contact whereby the latter is positively swung to open position by the actuating means through the fuse contacts.

In testimony whereof I affix my signature in presence of two witnesses.

EDWIN JOHNSON.

Witnesses:
 ERIC HALGAR,
 YRMA SWALNI.